Figure 1:
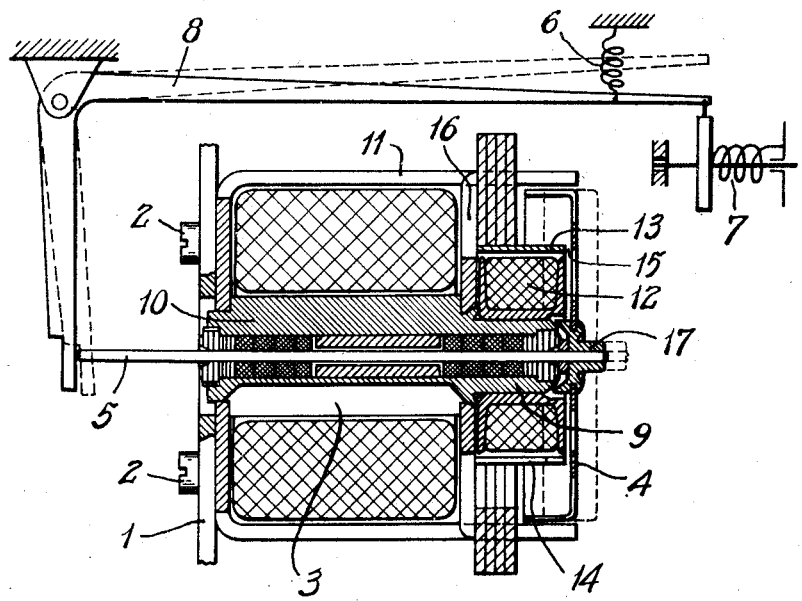

Sept. 11, 1945.  A. WIEDEMEIER  2,384,581

SYNCHRONOUS MOTOR TIME METER

Filed Nov. 12, 1941

Synchronous Motor

Synchronous Motor

Inventor:
Alfred Wiedemeier

Patented Sept. 11, 1945

2,384,581

UNITED STATES PATENT OFFICE 2,384,581

SYNCHRONOUS MOTOR TIME METER

Alfred Wiedemeier, Zug, Switzerland, assignor to Landis & Gyr, A.-G., Zug, Switzerland, a corporation of Switzerland Application November 12, 1941, Serial No. 418,727
In Switzerland December 30, 1940

7 Claims. (Cl. 172—120)

The present invention relates to synchronous motor time meters and is an improvement on the patent to Spahn No. 2,099,759.

In time meters equipped with a small synchronous motor and auxiliary or standby mechanism, for driving timing mechanisms such as clocks, time switches and the like, an auxiliary armature or relay controlled by the stray flux of the motor is commonly used for releasing and locking the motion control device of such auxiliary mechanism. Such auxiliary armature or relay mechanisms, however, apart from the fact that they make the motor more intricate and costly and require in addition an increased watt consumption, have the important fault that they are unreliable. For it may happen in such arrangements, if the voltage slowly drops or increases, or in the case of a heavy voltage drop which may be due to short circuits or temporary overloads in service interruptions, that the motion control device is released or held in a defective manner. In the case of great variations of potential it is also possible for the motion control device to be alternately released, locked and released again. On account of this play the motion control device may lose its quickness of action, with the result that when the rotor falls out of step the auxiliary mechanism and hence the motion of the clock stops entirely.

For these reasons a synchronous motor time meter was proposed in the Patent No. 2,099,759, in which the axial force of attraction of the stator field causes a shifting of the rotor, which motion is employed to perform working operations, for example to lock the motion control device of the auxiliary mechanism. It has been found however that in such time meters the force available for operating on the motion control device of the auxiliary mechanism is in general too small to secure an entirely reliable operation of the synchronous motor time meter under all conditions.

The invention is an improvement on the synchronous motor time meter described in the Patent No. 2,099,759. The invention attains this purpose by producing the shifting of the rotor in one direction not only by means of the force of attraction of the stator field, but in addition also by means of a supplementary field produced by an auxiliary coil. The preferred arrangement, in a synchronous motor time meter, is to mount the auxiliary coil on an end of the core projecting into a casing formed by the stator poles and a cup-shaped rotor and so that the iron hub of the rotor forms the armature influenced by the additional magnetic field. To reduce stray losses and increase the strength of the additional magnetic field an inductor and shield ring is arranged in said casing to surround the auxiliary coil, said ring being provided with a small air gap in its side opposite the rotor and being fastened to a pole part of the stator. This iron ring may be slit to prevent as far as possible the formation of eddy currents. The auxiliary coil may be connected to the exciting coil either in series or in parallel with a part of the exciting coil.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Figure 2:
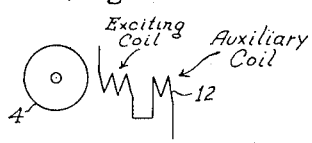
Figure 3:

The accompanying drawing shows in Fig. 1 the preferred embodiment of a synchronous motor time meter having an auxiliary mechanism of which, for simplicity's sake only the motion control device is shown; and, shows diagrammatically in Fig. 2 a series connection of the auxiliary coil to the exciting coil and in Fig. 3 a parallel connection of the auxiliary coil to a part of the exciting coil.

The synchronous motor 3 is secured to a supporting member 1 by means of the screws 2, the axle 5 carrying the rotor 4 being supported so as to be displaceable in the longitudinal direction. The left end of the said rotor axle 5 coacts with the bell crank 8 subjected to a counterspring 6 and regulating the motion control device 7.

An auxiliary coil 12 is arranged on the right hand end 9 of the core 10 of the stator 11 which extends outward through the space between the pole pieces, and this coil is surrounded by an iron inductor and shield ring 13 which serves to reduce flux losses and to concentrate and increase the strength of the additional magnetic field. The iron ring 13, which is provided with a slit 14 to prevent eddy currents, is attached to the pole part 16 of the stator 11 and is spaced from the rotor by a small air gap 15. The rotor is provided with an iron hub 17 which is fixed to the right hand end of the shaft projecting beyond the right hand end of the core 10, said hub forming the armature influenced by the additional magnetic field. The opposing end surfaces of this armature 17 and the core 10 are conically shaped in order to secure high efficiency of the auxiliary coil arrangement.

In the position shown in the drawing the synchronous motor 3 is in the energized state, the rotor 4 being thus attracted. In this state the force of attraction produced by the additional field and exerted on the rotor 4 is greatest, and the force of attraction from the main stator field is smallest. The great force of attraction exerted by the additional field insures above all a reliable switching operation of the control motion device. In view of the great force of attraction exerted by the additional field, the counterspring 6 may be given such strength that whenever the voltage drops below a certain value corresponding to the counterpressure, the armature 17 is pulled off forcibly and suddenly. In that case the rotor 4 is jerked to the right, the motion control device 7 being thereby released by means of the bell crank 8. The locking of the motion control device 7 is produced in an analogous manner.

The arrangement described can of course not only be used for actuating a motion control device. It may also be utilized to effect other operations, as for example to indicate disturbances in synchronous pointer type clocks.

The invention in its broader aspects is not limited to the specific mechanisms shown and described but departures may be made therefrom within the scope of the accompanying claims without departing from the principles of the invention and without sacrificing its chief advantages.

What I claim is:

1. A synchronous motor controlled timing apparatus having in combination a stator coil, a rotor axially shiftable under the influence of the magnetic field produced by the coil, a motion controlling device normally held in one position and shiftable to a different position by axial shifting of the rotor, an auxiliary coil energized when the stator coil is energized to produce an auxiliary magnetic field, and a magnetizable hub on the rotor forming an armature influenced by the field of the auxiliary coil to also axially shift the rotor.

2. A time measuring means for an electric circuit including in combination a motion controlling device, a synchronous motor having a field coil and a rotor axially movable in one direction under the influence of the magnetic field produced by the coil, an auxiliary coil mounted on the motor and energized when the field coil is energized to produce an auxiliary magnetic field also influencing the rotor to axially move it in the same direction, a holding device movable by the axial shifting of the rotor to engage and hold the motion controlling device from movement, and means acting on said holding device for retracting it and causing it to axially shift the rotor in the opposite direction when the magnetic fields are interrupted.

3. In a synchronous motor controlled time measuring apparatus, a synchronous motor having a stator, a core, pole pieces, a field winding for producing a main magnetic field, and an axle rotatable and axially movable under the influence of said field an auxiliary coil mounted on an end of the core and between the same and the pole pieces for producing an auxiliary magnetic field, an iron ring having a small air gap and arranged to surround the auxiliary coil and attached to one of the pole pieces, a cup-shaped rotor mounted on the axle adjacent to the auxiliary coil and having a hub of magnetizable material forming an armature influenced by the auxiliary field to axially shift the shaft, and motion controlling means controlled by the axial shifting of the shaft.

4. In a synchronous motor controlled time measuring mechanism, a motion controlling device, means for producing a main magnetic field, means for simultaneously producing an auxiliary magnetic field, a rotor rotatably mounted in the main magnetic field and axially movable under the influence of both fields, and means for utilizing the axial movement of the rotor for controlling the action of the motion controlling device.

5. In a synchronous motor controlled time measuring mechanism, means for producing a main magnetic field, means for simultaneously producing an auxiliary magnetic field, a rotor rotatable under the influence of the main magnetic field and axially movable in one direction under the influence of both magnetic fields, a normally inactive motion stop device adapted to be rendered active by the axial shifting of the rotor by the magnetic fields, and means acting on said device to render it inactive and to axially move the rotor in the opposite direction when the fields are interrupted.

6. In a synchronous motor controlled time measuring mechanism, a motion control device, a synchronous motor having a field coil and a rotor axially movable under influence of the magnetic field produced by the coil, an auxiliary coil energized with the field for producing an auxiliary magnetic field also influencing the rotor to axially move it, and means operated by the axial movement of the rotor for holding the motion controlling device from movement and releasing it when the magnetic fields are interrupted.

7. An apparatus of the character set forth in claim 1 wherein the auxiliary coil is mounted on the stator of the motor and in which an iron ring with a small air gap surrounds said coil and is attached to a pole part of the stator.

ALFRED WIEDEMEIER.